United States Patent [19]
McLean, Jr.

[11] 3,741,603
[45] June 26, 1973

[54] LOCKING PLATE FOR AXLE END CAP

[76] Inventor: Ralph M. McLean, Jr., 12100 Georgian Trail, Des Peres, Mo. 63121

[22] Filed: June 9, 1971

[21] Appl. No.: 151,241

[52] U.S. Cl............. 295/36 R, 105/218 R, 151/54, 301/108 S, 308/180
[51] Int. Cl. ... B60b 35/02, F16b 39/10, F16c 35/04
[58] Field of Search ................ 151/54, 55; 277/29; 295/36 R; 301/108 S; 105/218 R; 308/180

[56] References Cited
UNITED STATES PATENTS

| | | | |
|---|---|---|---|
| 1,915,088 | 6/1933 | Eastburg............................. | 151/54 |
| 716,860 | 12/1902 | Budde.................................. | 151/54 |
| 1,357,010 | 10/1920 | Timmons......................... | 301/108 S |
| 2,977,138 | 3/1961 | Brittain, Jr............................ | 277/29 |
| 3,493,026 | 2/1970 | Donofrio et al. ..................... | 151/54 |
| 3,523,709 | 8/1970 | Heggy et al........................ | 295/36 R |

Primary Examiner—Gerald M. Forlenza
Assistant Examiner—Howard Beltran
Attorney—Gravely, Lieder & Woodruff

[57] ABSTRACT

A locking plate for the axle end cap of railroad bearings in which the locking plate is provided with a central aperture for receiving a grease fitting, said grease fitting adapted to interlock with said locking plate to space and connect said locking plate to the axle end cap, and a plurality of cap screw head apertures spaced about the central aperture each having a plurality of sides for receiving a cap screw head, said cap screw apertures extending around the cap screw heads to prevent rotation thereof.

8 Claims, 7 Drawing Figures

PATENTED JUN 26 1973　　3,741,603
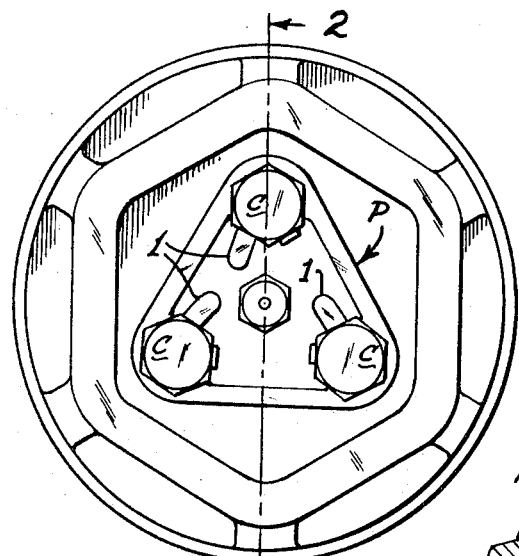
FIG.1
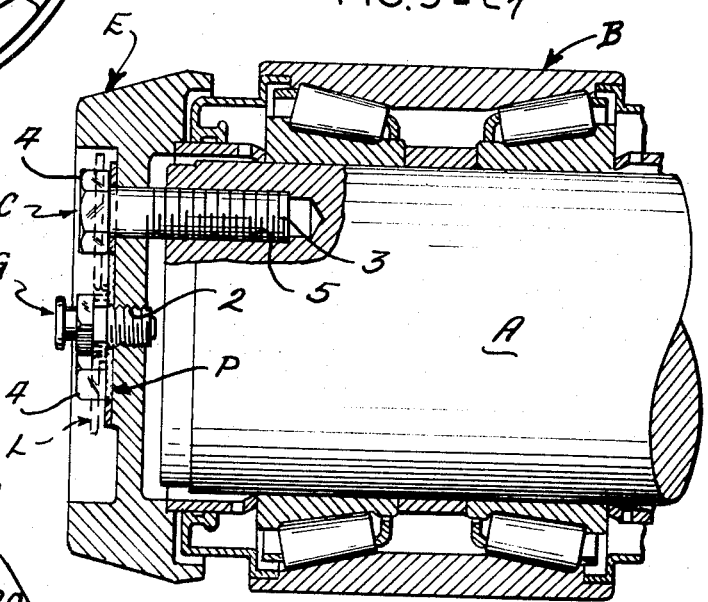
FIG.5
FIG.2
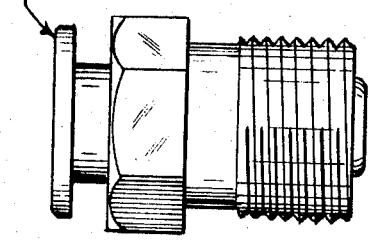
FIG.6
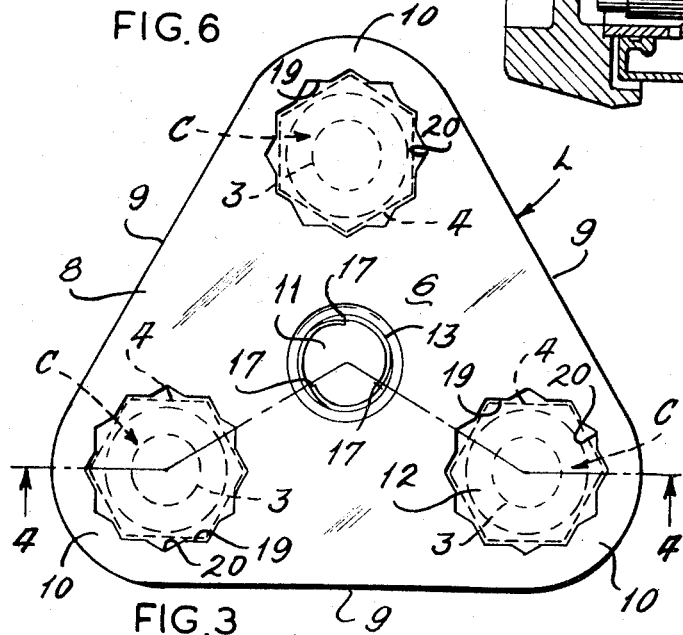
FIG.3
FIG.4
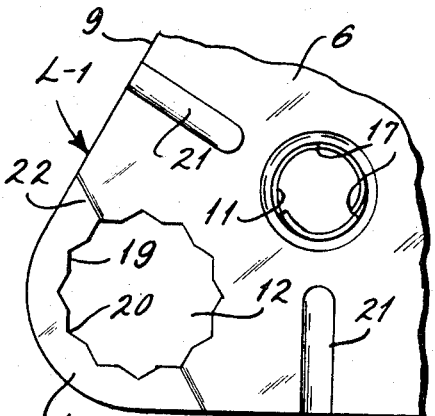
FIG.7
INVENTOR:
Ralph M. McLean, Jr.
BY Gravely, Lieder & Woodruff
ATTORNEYS

LOCKING PLATE FOR AXLE END CAP

This invention relates to an improved locking plate for locking a plurality of spaced cap screws against rotation, and in particular, to a locking plate for securing cap screws used to lock an axle end cap in position on a railroad bearing assembly.

The ends of most railway car axles provided with roller bearings are provided with three holes for receiving three cap screws or axle end cap bolts which secure the axle end cap to the railway car axle. These cap screws must be secured with the proper torque or tightness and must remain tight during usage, since otherwise the roller bearings may not be properly aligned or lubricated, with the result that the bearing may be damaged or the railroad car may be derailed.

In the past, means were provided for preventing the three cap screws from becoming loose due to vibration or torque when the railway car is in motion. Years ago a wire was threaded through diametral holes in the heads of the cap screws to prevent the three cap screws from becoming loose. This was expensive and otherwise not satisfactory. This method and others were substantially replaced in the 1950s with a triangular plate having an opening at each corner for receiving the shank of the cap. Two tabs were positioned adjacent to each opening, either one of which could be bent up to lie along one side of the hexagonal or six sided head of the cap screw, after the cap screw was properly tightened, to prevent rotation of the cap screw.

Such triangular plates are in present use but have certain disadvantages. For example, all cap screws must be removed in order to apply this triangular plate. The tab thereon is not always in the proper position to be bent up at right angles to lie flatly against one face of the cap screw head. Sometimes the tabs are improperly bent up by a workman or fail to remain in contact with the cap screw head. The bending of the tab may cause the metal to work harden and become brittle, so that the locking plate cannot be reused because the tab will break off if it is bent again. This type of triangular plate does not provide positive locking for all three cap screws.

The principal object of the present invention is to provide a locking plate for spaced cap screws which provides positive locking at all times by contacting each cap screw substantially or completely around the entire circumference of each of the cap screws whose rotation is to be prevented so that it will not become improperly torqued. Another object is to provide a locking plate which is held in position by a grease fitting which is presently mounted in the center of all axle end caps and which is not known to come loose in actual operation. Another object of this invention is to provide a locking plate which becomes integral with a grease fitting after its first application to the axle end cap, so that the grease fitting and the locking plate can be removed as a unit and be reused as a unit. Another object is to provide a locking plate which in use is positioned in spaced substantially parallel relation with the outer vertical surface of an axle end cap, so that if desired, the old style triangular plate with tabs need not be removed before applying the present locking plate, thereby saving labor since the three cap screws need not be removed but only the bent-up tabs need be flattened or broken off. Another object is to provide a locking plate which can be made from the same or a slightly thicker gauge of material, since no part of said plate must be bent by a workman. Another object is to provide a locking plate which is subject to less failure due to human error than previous locking plates, since no wires have to be threaded and no tabs bent up into proper contacting position with the cap screws.

These and other objects and advantages will become apparent hereinafter.

This invention is embodied in a locking plate adapted to be secured to an axle end cap, said locking plate having a central aperture for receiving a grease fitting, and a plurality of cap screw head apertures spaced outwardly of the central aperture each having a plurality of sides for receiving a cap screw head, said locking plate being constructed so as to be spaced from the axle end cap at the head apertures, said sides on said head apertures extending circumferentially around the cap screw heads for preventing rotation thereof.

The invention also consists in the parts and in the arrangements and combinations of parts hereinafter described and claimed. In the accompanying drawings which form part of this specification and wherein like numerals and symbols refer to like parts wherever they occur:

FIG. 1 is a side elevational view of an axle end cap showing the bolts secured with the prior art triangular plate presently in use, FIG. 2 is a vertical cross-sectional view taken along the line 2—2 of FIG. 1, showing said prior art plate on an axle end cap and showing in dotted lines the locking plate which embodies the present invention, FIG. 3 is a top plan view of a locking plate embodying the present invention, with the cap screw heads and shanks being shown in dotted lines.

FIG. 4 is a vertical cross-sectional view of said locking plate taken along the line 4—4 of FIG. 3, FIG. 5 is an enlarged fragmentary view of the locking plate shown in FIG. 3 secured to an axle end cap by a grease fitting, FIG. 6 is a side elevational view of a grease fitting used with the present invention, and FIG. 7 is a fragmentary top plan view of locking plate embodying a modified form of the present invention.

Referring now to the drawings, FIGS. 1 and 2 show a prior art triangular plate P with bendable tabs 1 thereon. There are two tabs 1 adjacent to each cap screw opening. This plate P is used on an axle end cap E to prevent the three cap screws C, which secure the axle end cap E to the axle A, from becoming loose. The axle A is provided with a roller bearing B of suitable design. The size and capacity of the axle A and roller bearing B may vary with the type and/or capacity of railroad car. The center of the axle end cap E has an opening 2 for receiving either a plug or a grease fitting G. If a plug is used, a suitable grease fitting is provided elsewhere or suitable means for lubricating the roller bearings B are provided. However, most axle end caps E on railroad cars fitted with roller bearings now have a grease fitting G positioned at the center thereof. The axle end cap E rotates with the axle A when the train is in motion. It is important to keep the axle end cap E properly secured to the axle A so as to retain the roller bearing in the proper position in some installations and to retain the lubricant.

A locking plate L which embodies the present invention is shown in FIGS. 3-5. This locking plate L is made from suitable strong material, such as steel, preferably 1025 to 1050 carbon steel, and preferably suitably treated to prevent corrosion. A thickness of about 0.050 inches is preferred, although the thickness of the material may vary as desired. The prior plate P could have a maximum thickness of about 0.047 inches, since any thicker material made it too difficult to bend up the tabs 1. The use of 1025 to 1050 carbon steel permits the steel to be heat treated if it is desired to make the locking plate L harder and to greater resist any wear due to any tendency of the cap screws C to rotate during movement of the train.

The locking plate L embodying the present invention is designed to prevent rotation of each of a plurality of cap screws C. Each cap screw C in present use has a shank 3, and a hexagonal head 4, which is about 0.50 inches high although this varies with the size of the cap screw. The cap screws and locking plates vary in size in accordance with certain standards set for the several different sizes of axles used for freight cars and passenger cars. The shank 3 is sufficiently long to extend into threaded holes 5 in the axle A (FIG. 2). The locking plate L has a main body 6 with a flat bottom or inside surface 7 which is adapted to be positioned adjacent to the axle end cap E, and a flat top or outside surface 8 which can be viewed by the workman after the locking plate L has been installed. The locking plate L is substantially triangular, and has three sides 9 connected by curved end portions 10. The locking plate L has a central aperture 11 for receiving a grease fitting G, and has three cap screw head receiving means or head apertures 12.

The central aperture 11 is defined by a flange 13 having an outer or upper edge 14. The lower part of the flange 13 has a rib or shoulder 15 and a spacer portion 16 which connects said shoulder 15 with the main body 6 of the locking plate L. The shoulder 15 is spaced a predetermined distance from the main body 6 of the locking plate L, preferably about 0.25 inches, so as to space the plate L about 0.25 inches from the axle end cap E. The height of the cap screw heads 4 is about 0.50 inches, so that the locking plate L is positioned approximately one-half of the height of the cap screw head 4 (FIG. 2). If desired, the flange 13 may be provided with one or more slits 17, preferably three slits 17, so that the flange 13 has separated segments 18 which are bent inwardly and function as a lock washer when a grease fitting G is inserted through the central aperture 11 and is tightened to secure the locking plate L to the axle end cap E (FIG. 5).

Each head aperture 12 has a plurality of sides 19 and is shown with twelve corners 20 for receiving the multiple or six corners of a cap screw head 4 in contacting relation. If each head aperture 12 were hexagonal with six corners, an already tightened cap screw C might have to be rotated almost an additional 60° in order to properly orient said cap screw C to allow the locking plate L to pass thereover. This would require too much rotation and too much torque. With twelve corners 20, each head aperture 12 in effect has two receiving positions for the multiple sided cap screw heads 4, so that a properly tightened cap screw C need be advanced only a maximum of slightly less than 30° in order to assure proper orientation to allow the locking plate L to be installed. A properly tightened cap screw C should not be backed off in order to orient said head, since this would not provide sufficient torque between the axle end cap E and the axle A.

FIG. 7 shows a locking plate L-1 embodying a modified form of the present invention. In this form, the locking plate L-1 is identical to the locking plate L shown in FIG. 3 except that it is provided with corrugations 21 to provide greater strength to the locking plate L-1 for a given gauge of material. The corrugations 21 are positioned between the head apertures 12 and extend from a point near the spacer portion 16 radially outwardly to the side 9 of the locking plate L-1. The corrugations 21 extend downwardly from the inside surface 7 of the locking plate L-1 in the same direction as the shoulder 15, but the corrugations 21 are not as deep as the spacer portion 16. The corrugations 21 are positioned out of the main body 6 plane of the locking plate L-1 only about one-half as far as the shoulder 15, since the corrugations 21 are designed for strength purposes and not as spacers for positioning the locking plate L-1 away from the axle end cap E. If desired, the outer portions of the curved end portions 10 may be bent downwardly slightly, as at 22, so that each head aperture 12 will have sides 19 which contact the cap screw heads 4 at various positions over the half of the height of the cap screw head 4 which is adjacent to the shank 3 of the cap screw C.

In actual practice the shanks 3 of the cap screws C are inserted through holes in the axle end cap E and into the aligned threaded holes 5 in the axle A. Each cap screw C is tightened to the proper tightness, which for example, is about 250 foot pounds torque for a one inch cap screw. The proper torque in foot pounds is less for smaller cap screws and greater for larger cap screws. This torque is determined by a special wrench which measures the torque being applied to a cap screw. In practice, a workman applies one cap screw C to the proper tightness and then applies the two other cap screws C to the proper tightness. Standard procedure then calls for the workman to recheck the first cap screw C, since the first cap screw C has probably been loosened to about 200 to 230 foot pounds torque due to slight shifting or bending of the axle end cap E as the other cap screws C are tightened.

Standard procedure calls for the workman to tighten the first cap screw C to the proper 250 foot pounds torque, or whatever torque is specified for a given installation. With the prior triangular plate P (FIG. 1) if a workman did not re-tighten the first cap screw C, he would then bend up a tab 1 to retain the loose cap screw C in position and prevent it from loosening further. This loose cap screw C had a greater tendency to become loose than the properly tightened cap screws C, and could result in roller bearing alignment problems and/or lubrication problems. With the locking plate L (FIG. 3-5), if the first cap screw C becomes slightly loose after the second and third cap screws C are tightened, the workman is more likely to re-tighten said first cap screw C since the recommended procedure for applying the locking plate L is to rotate the cap screws to a tighter position (and not a looser one) in order to properly align the cap screw heads so that the locking plate L may pass over properly oriented cap screw heads.

As is apparent, the locking plate L (FIGS. 3-5) may be installed without removing any cap screws C since the locking plate L is secured to the axle end cap E solely by means of the grease fitting G. Should the grease fitting G be removed, the locking plate L is removed along with the grease fitting G, since the two have become an integral assembly due to the lock washer action of the flange 13. This has the further advantage to railroads since workmen sometimes throw the usable grease fittings G and locking plates P away and install new ones. Once removed, the present locking plate L and grease fitting G can be installed on the same or on a different end cap E of the same size. In so doing, no cap screws C need be loosened or removed, as in the case of previous locking means. This saves labor and "down time" of the equipment. In fact, to install this new locking plate L, the locking plates P in standard use today need not be removed as they would have to be if replaced by an old similar type of locking plate P. Only their bent up tabs 1 need to be bent downwardly or broken off and the new locking plate L can be installed, since said locking plate L is maintained in spaced relation from the axle end cap E a predetermined distance of about one-half the height of a cap screw head 4 or slightly less, which distance is greater than the thickness of the prior art plates P. The prior art locking plates P have certain standards set out by the Association of American Railroads and are of certain set standard sizes for the various classes of axle end caps E. The present locking plate L will also have certain standards for the various types of axles whose cap screws may be of different sizes and may be spaced apart slightly different distances.

This invention is intended to cover all changes and modifications of the example of the invention herein chosen for purposes of the disclosure, which do not constitute departures from the spirit and scope of the invention.

What is claimed is:

1. A locking plate for a railroad axle and bearing assembly having an axle end cap secured to the axle by cap screws having cap screw heads, said locking plate having a central aperture therethrough adapted to receive a grease fitting, a flange surrounding said central aperture positioned angularly to the plane of said locking plate, said flange extending outwardly of the outside surface of said locking plate and inwardly approximately to the inside surface of said locking plate, said locking plate having a shoulder thereon and a spacer portion mounted between said shoulder and said locking plate, whereby said spacer is adapted to position said locking plate in spaced relation to said axle cap, and a plurality of screw head apertures spaced outwardly of the central aperture, said head apertures each having a plurality of sides and corners, said cap screw apertures being adapted to extend circumferentially around the cap screw heads to prevent rotation thereof.

2. The locking plate set forth in claim 1 wherein said locking plate is provided with corrugations which are positioned outwardly of the central aperture and between said head apertures.

3. The locking plate set forth in claim 1 wherein said shoulder and spacer are dimensioned so that said locking plate when installed is positioned from the axle end cap in substantial parallel relation thereto a distance of about one-half the height of the cap screw heads.

4. The locking plate set forth in claim 1 wherein said flange has slits therein positioned at an angle to the top edge of said flange so as to act as a lock washer upon deformation of said flange when said locking plate is assembled to an axle end cap by means of the grease fitting.

5. A locking plate for a railroad axle and bearing assembly having an axle end cap secured to the axle by cap screws having cap screw heads, said locking plate having a central aperture therethrough for receiving fastening means, and a plurality of cap screw head apertures spaced outwardly of the central aperture, said head apertures each having a plurality of sides and corners, said cap screw apertures being adapted to extend circumferentially around the cap screw heads to prevent rotation thereof, said locking plate having means thereon for maintaining said locking plate in spaced relation to said axle end cap at said cap screw heads.

6. The locking plate set forth in claim 5 wherein said means for maintaining said locking plate in spaced relation to the axle end cap comprises a flange circumscribing said central aperture.

7. The locking plate set forth in claim 5 wherein said fastening means comprises a grease fitting.

8. The locking plate set forth in claim 5 wherein said locking plate has curved end portions and the outer portions of the curved end portions are bent slightly, so that each head aperture will have sides which contact the cap screw head at various positions spaced from the axle end cap.

* * * * *

UNITED STATES PATENT OFFICE
CERTIFICATE OF CORRECTION

Patent No. 3,741,603     Dated June 26, 1973

Inventor(s) Ralph M. McLean, Jr.

It is certified that error appears in the above-identified patent and that said Letters Patent are hereby corrected as shown below:

The illustrative figure on the cover sheet should be canceled and the figure shown below substituted therefor. Fig. 1 of the drawing should be designated as being Prior Art.

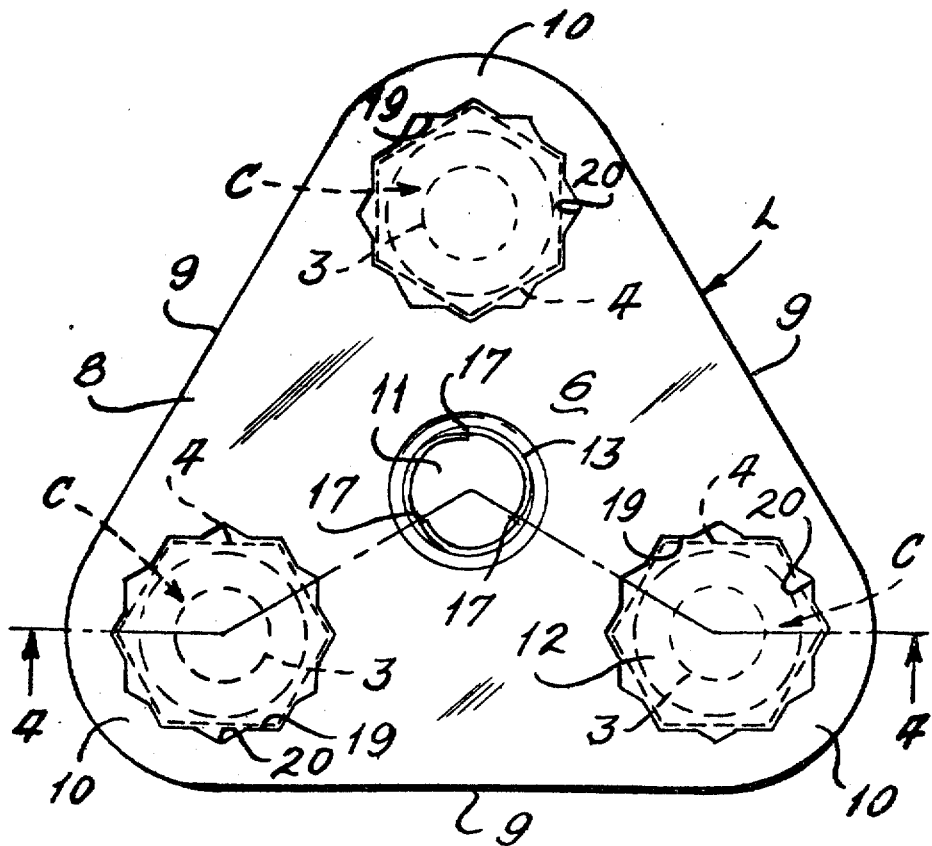

Signed and sealed this 8th day of October 1974.

(SEAL)
Attest:

McCOY M. GIBSON JR.
Attesting Officer

C. MARSHALL DANN
Commissioner of Patents